(12) United States Patent
Anderson et al.

(10) Patent No.: US 8,200,812 B2
(45) Date of Patent: Jun. 12, 2012

(54) REDUCING WORKLOAD ON A BACKEND SYSTEM USING CLIENT SIDE REQUEST THROTTLING

(75) Inventors: Paul Anderson, Amsterdam (NL); Wim De Pauw, Ossining, NY (US); Rohit D. Kelapure, Research Triangle Park, NC (US); Andrew H. Richter, Research Triangle Park, NC (US)

(73) Assignee: International Business Machines Corporation, Armonk, NY (US)

( * ) Notice: Subject to any disclaimer, the term of this patent is extended or adjusted under 35 U.S.C. 154(b) by 72 days.

(21) Appl. No.: 12/651,197

(22) Filed: Dec. 31, 2009

(65) Prior Publication Data

US 2011/0161488 A1 Jun. 30, 2011

(51) Int. Cl.
*G06F 15/173* (2006.01)
*G06F 15/16* (2006.01)

(52) U.S. Cl. ........................ 709/224; 709/233; 709/235

(58) Field of Classification Search .................... None
See application file for complete search history.

(56) References Cited

U.S. PATENT DOCUMENTS

| | | | | |
|---|---|---|---|---|
| 6,297,819 | B1 * | 10/2001 | Furst | 715/733 |
| 2002/0006603 | A1 * | 1/2002 | Peterson et al. | 434/365 |
| 2004/0148307 | A1 * | 7/2004 | Rempell | 707/102 |
| 2007/0112951 | A1 | 5/2007 | Fung et al. | |
| 2008/0313551 | A1 * | 12/2008 | Rapoport | 715/760 |
| 2010/0131668 | A1 * | 5/2010 | Kamath et al. | 709/233 |
| 2010/0229218 | A1 * | 9/2010 | Kumbalimutt et al. | 726/4 |

* cited by examiner

*Primary Examiner* — John B. Walsh
(74) *Attorney, Agent, or Firm* — Steven M. Greenberg, Esq.; Carey, Rodriguez, Greenberg & O'Keefe

(57) ABSTRACT

Embodiments of the present invention address deficiencies of the art in respect to workload management of backend systems and provide a novel and non-obvious method, system and computer program product for limiting a request rate from a client based on a health state of a server system. In one embodiment of the invention, a computer-implemented method for limiting a request rate from a client based on a health state of a server system that includes monitoring a server system, determining a measure of health of the server system, sending the determined measure of health to a client submitting a request to the server system and receiving a subsequent request from the client that is delayed by a time period, wherein the time period is based at least in part upon the determined measure of health. The computer-implemented method can further include receiving server system CPU utilization, determining an approximate predicted real server response time of a transaction and sending the determined approximate predicted real server response time of a transaction to a client submitting a request to the server system.

16 Claims, 2 Drawing Sheets

REDUCING WORKLOAD ON A BACKEND SYSTEM USING CLIENT SIDE REQUEST THROTTLING

BACKGROUND OF THE INVENTION

1. Field of the Invention

The present invention relates to workload distribution in network computing and more particularly to backend workload management by controlling the request rate of clients.

2. Description of the Related Art

In most, if not all, new and existing web applications, performance and capacity are difficult to predict as the source request rate is either unknown or poorly estimated. In large scale public web applications, the request rate can be high, variable and unceasing. Traditionally, load testing of the application attempts to prove that the system can cope with a certain predicted load; however such a synthetic load is generated in a very conventional manner, from a bell curve, the peak of which equates to a best guess maximum Transactions Per Second (TPS) and is being served by a perfectly operating application system. In contrast, primary and dependent systems will degrade or fail in subtle ways and transaction rates vary wildly. As such, a fundamental difference exists between the synthetic TPS rating of a system in test and the real load a system will have to face in the field.

The queue based nature of many sophisticated web applications, with synchronous calls from the application server to multiple backend systems, each backend system having its own varying response times and performance profiles, coupled with high and variable client request rates can lead to very fast failures in the event one of the components is failing and "browning out". Additionally these situations are difficult to diagnose and can give end users nothing more than a blank screen as feedback. In other words, there is no feedback about the health of the backend system to the client.

In addition, traditional load balancing does not address the fundamental request transactions per second (TPS) that the "system" has to handle. Accordingly, modern load balancers cannot properly manage the flow of requests generated by the clients.

BRIEF SUMMARY OF THE INVENTION

Embodiments of the present invention address deficiencies of the art with respect to workload management of backend systems and provide a novel and non-obvious method, system and computer program product for limiting a request rate from a client based on a health state of a server system. In one embodiment of the invention, a computer-implemented method for limiting a request rate from a client based on a health state of a server system that includes monitoring a server system, determining a measure of health of the server system, sending the determined measure of health to a client, submitting a request to the server system and receiving a subsequent request from the client that is delayed by a time period, wherein the time period is based at least in part upon the determined measure of health.

In an aspect of this embodiment, the computer-implemented method can further include receiving server system CPU utilization, determining an approximate predicted real server response time of a transaction and sending the determined approximate predicted real server response time of a transaction to a client submitting a request to the server system. In another aspect of this embodiment, the computer-implemented method can further include embedding a system health value in a hyper text markup language (HTML) response. In yet another aspect of this embodiment, the computer-implemented method can further include converting links in a HTML response with an onClick function and transmitting the HTML response to a client submitting a request to the server system. In yet another aspect of this embodiment, the computer-implemented method can further include generating a processing notification for the request sent by the client.

In another embodiment of the invention, a data processing system for limiting a request rate from a client based on a health state of a server system can be provided. The data processing system can include a server configured for communicative coupling to one or more requesting clients over a computer communications network, a request throttler for embedding time delay values in HTML responses to client requests and a system health monitor comprising program code enabled to monitor the health of the server system and to determine a health valve of the server system.

Additional aspects of the invention will be set forth in part in the description that follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention address deficiencies of the art in respect to workload management of backend systems and provide a novel and non-obvious method, system and computer program product for limiting a request rate from a client based on a health state of a server system. In one embodiment of the invention, a computer-implemented method for limiting a request rate from a client based on a health state of a server system that includes monitoring a server system, determining a measure of health of the server system, sending the determined measure of health to a client submitting a request to the server system and receiving a subsequent request from the client that is delayed by a time period, wherein the time period is based at least in part upon the determined measure of health.

In an aspect of this embodiment, the computer-implemented method can further include receiving server system CPU utilization, determining an approximate predicted real server response time of a transaction and sending the determined approximate predicted real server response time of a transaction to a client submitting a request to the server system. In another aspect of this embodiment, the computer-implemented method can further include embedding a system health value in a hyper text markup language (HTML) response. In yet another aspect of this embodiment, the computer-implemented method can further include converting links in a HTML response with an onClick function and transmitting the HTML response to a client submitting a request to the server system. In yet another aspect of this embodiment, the computer-implemented method can further include generating a processing notification for the request sent by the client.

In another embodiment of the invention, a data processing system for limiting a request rate from a client based on a health state of a server system can be provided. The data processing system can include a server configured for communicative coupling to one or more requesting clients over a computer communications network, a request throttler for embedding time delay values in HTML responses to client requests and a system health monitor comprising program code enabled to monitor the health of the server system and to determine a health valve of the server system.

Figure 1:
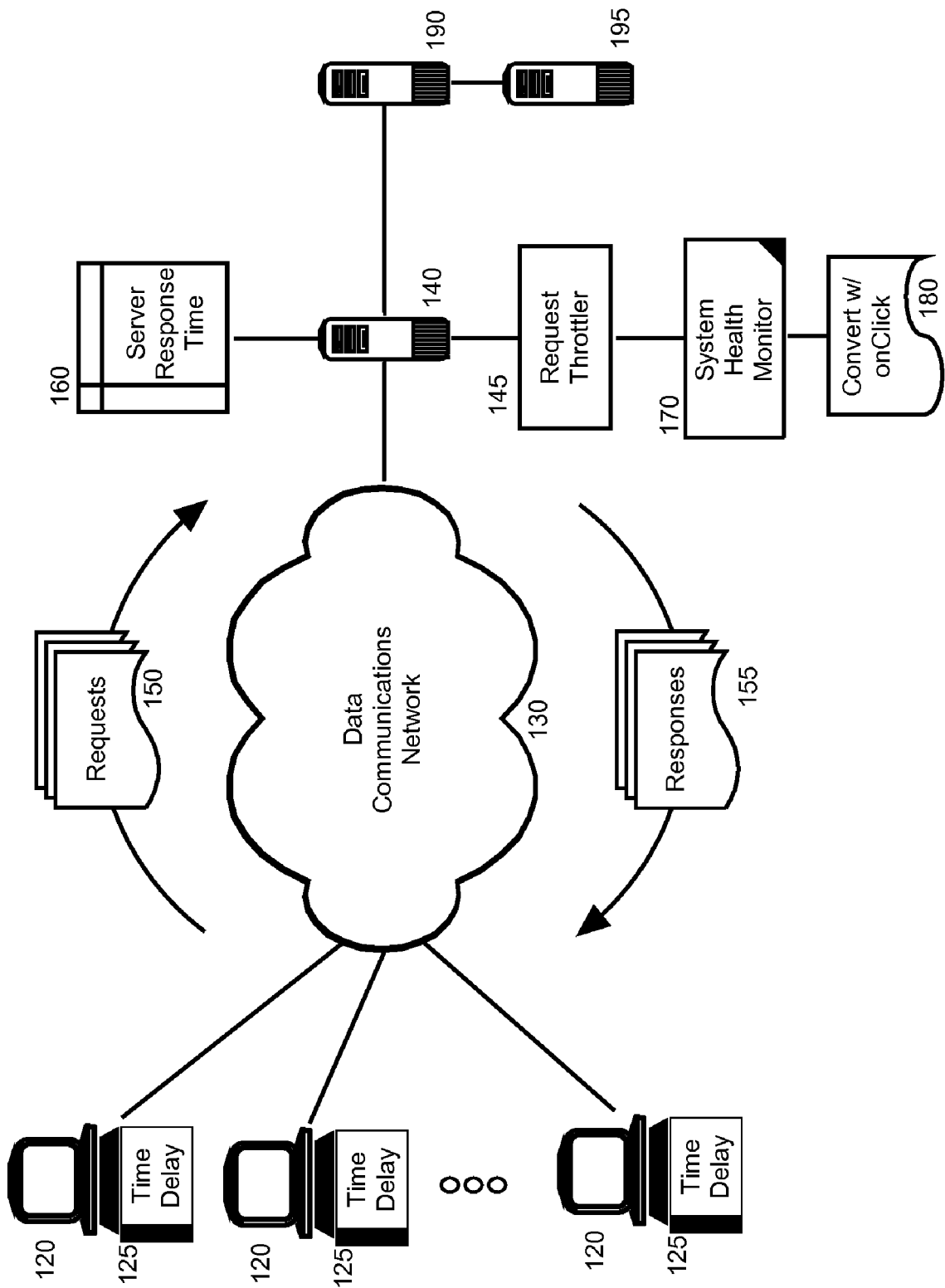
FIG. 1 is a schematic illustration of a website connected to users via a network configured for system health monitoring and reduction of workload on a backend system using client side request throttling.

In further illustration, FIG. 1 is a schematic illustration of a website connected to users via a network configured for system health monitoring and reduction of workload on a backend system using client side request throttling. As shown in FIG. 1, one or more servers 140, 190 and 195 (or server processes) can be load managed according to the web server 140 in order to service requests 150 from individual clients 120 over the data communications network 130. The requested web content is generated by the web server 140 and/or application server 190. The website may comprise a single server such as web server 140, or comprise multiple servers such as web server 140, application server 190 and database server 195. The servers provide advanced features or services for a website required for transaction processing. For example, application server 190 may provide execution and generation of e-commerce applications and access to data stored on database server 195. When multiple users, e.g., clients 120 access the website simultaneously, the workload on web server 140 and the backend servers (190 and 195) may increase substantially. If the workload on any of the servers exceeds the available capacity, the website may appear unavailable to clients accessing the website. To achieve control of the loads on the system, a request throttler 145 can be coupled to the web server 140. Importantly, to control the number of requests 150 which arrive in the web server 140, system health logic 170 can be coupled to the request throttler 145 in order to monitor the health of the server system (e.g., servers 140, 190 and 195).

Specifically, system health logic 170 can monitor and collect all necessary system information, such as, but not limited to CPU utilization, disk I/O utilization, system paging, network bandwidth utilization, the application server's 190 web container percentage thread being utilized, the application server's 190 average response time, the database and connection pool size and the like. System health logic 170 can reduce the multiple metrics to a single health value or matrix of health values. The request throttler 145 can embed the health value in a HTML response 155, which is returned to the client users 120. Each of the client users 120 can have a client browser with a time delay function 125 that can take the returned health value and calculate the corresponding time delay, typically in milliseconds. A Convert onClick function 180 can be coupled to the request throttler 145 and/or web server 140. The Convert onClick function 180 can render and/or convert each link in a returned HTML page, into a JavaScript onClick call, which includes a string parameter of that particular link. When a client user 120 clicks on any link in the returned HTML page, e.g., response 155, that link does not immediately generate a request to the server 140. Instead, the selected link calls the onClick function, which delays the transmission of the request for a calculated time based on system health, e.g., the embedded health value. Accordingly, in this embodiment, a browser of the client user 120 will delay the transmission of the request. In embodiments, the delay of the transmission of the request can be conditioned upon the completion of the page rendering. In other words, the client user 120 must wait for the page to be completely rendered prior to selecting any link on the page. In this manner, the client user 120 would not be able to negate the effect of the calculated delay.

In operation, if by delaying the requests for all client users 120, the system health/capability improves, then this is reflected in a different health value being returned to the client in the HTML response 155 of the delayed request. Subsequently, the next client user request 150 can be delayed by less time or possibly not at all. In effect, the system can autonomically balance and deliver the most optimal end user response times, guard against overload, cap transaction per second (TPS) to that which the server is rated, cope with the variable response of backend systems and even some backend system total failures.

Figure 2:
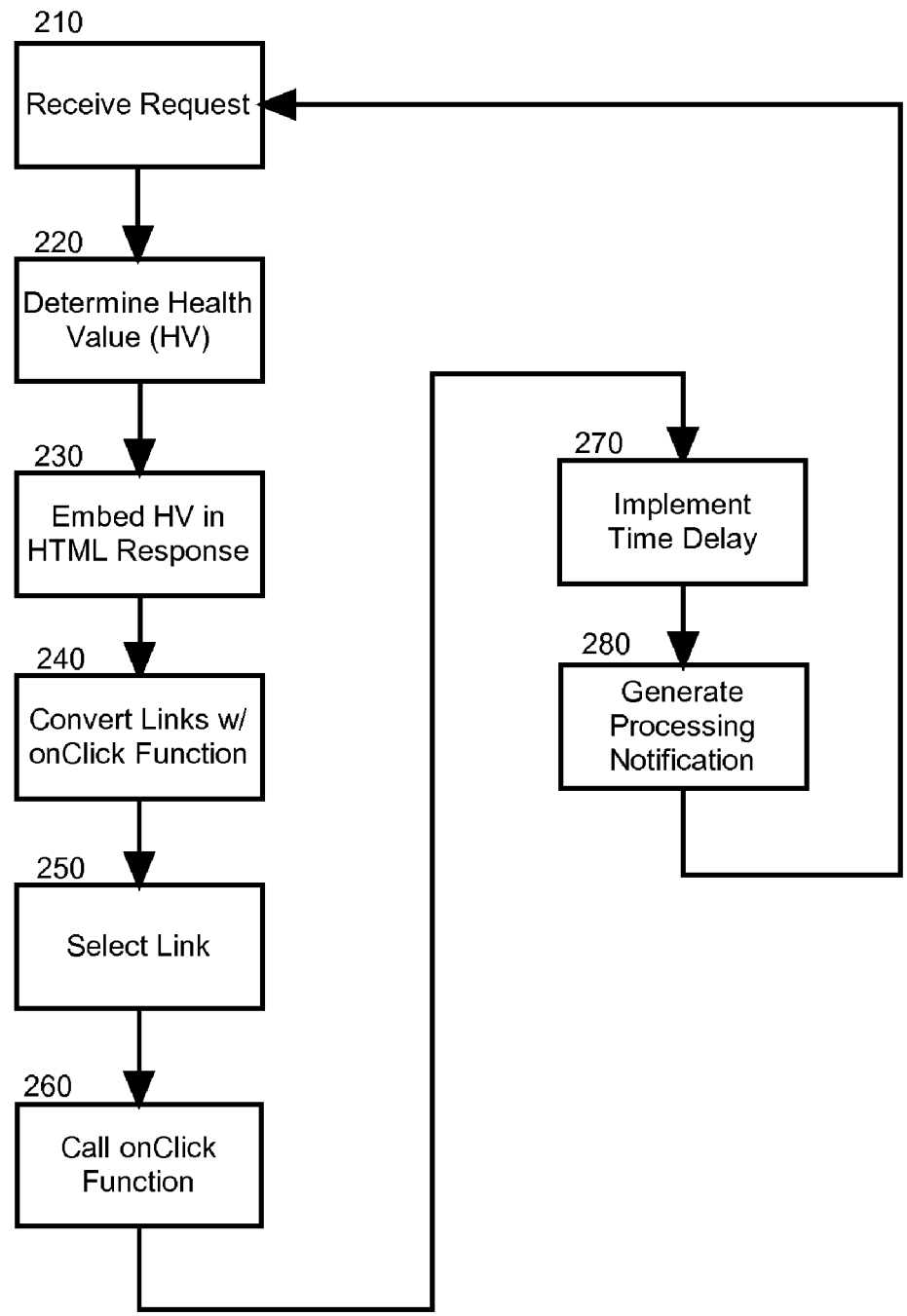
FIG. 2 is a flow chart illustrating a process for limiting a request rate from a client based on a health state of a server system.

In more specific illustration, FIG. 2 is a flow chart illustrating a process for limiting a request rate from a client based on a health state of a server system. Beginning in block 210 a web server 140 can receive a request from a client user 120. In block 220, a measure of system health, the system health value can be determined by the system health monitor 170 and/or the request throttler 145. In block 230, the request throttler 145 can embed the system health value in a HTML response 155 to be returned to the client user 120. In block 240, the Convert onClick function 180 can render and/or convert each link in a returned HTML page, into a JavaScript onClick call, which includes a string parameter of that particular link. In block 250, a client user 120 selects any link in the returned HTML page, which in turn will call an onClick function in block 260. Accordingly, instead of transmitting another request for web server 140, the onClick function is called which in turn implements the delay, which is determined from the system health value, as indicated in block 270.

Finally, in block 280, a processing notification can be generated and presented to the client user 120. In embodiments, the processing notification can be simulated using normal click feedback. For example, a client user 120 can send a request and seek validation that his request has been accepted. On some browsers/user interfaces (UI) there can be the playing of a "click" sound and the display of an animating "throbber" in a corner. In other embodiments, a more explicit indication that the request is "processing", waiting is required and the expected completion time can be display in a small borderless DHTML "popover" frame. The DHTML popover frame can include a progress animation that progresses from 0 to completion in real time, e.g., if the delay is 0.93 seconds the progress, however graphically depicted, would go from 0 to 100% in 0.93 seconds. Although the user is not being told that his request is being explicitly delayed before it leaves the client.

In embodiments, an approximate predicted real server response time value for a transaction can be included in the returned HTML response 155 for every request. The approximate predicted real server response time value for a transaction can be used in addition to the main calculated delay based on current system health, to limit delay to a SLA maximum as well as improving the accuracy of the semi-explicit feedback. In other embodiments, rather than just a single health valve being returned, a matrix of health values derived from multiple measurements points in the server system can be sent to the client user 120 and a more selective delay calculated. For example, if a certain backend system (e.g., 190, 195) is for some reason slow at a particular time then that would be reflected by a change in one valve of a matrix of assume 30 numbers returned on each request. The proxied links in the page would carry an additional parameter for the JavaScript time delay function 125, which can be server resources that this link/request/transaction would invoke. If the link does not call a web and/or application server transaction that itself calls the affected backend server then its delay is based on overall health. However, if the link would touch the poorly performing server then the delay could be increased and therefore load on the stressed component reduced while not affecting other transaction types. In addition, the requests can be throttled by disabling links in the HTML response 155, selectively graying out resource intensive links and adding the dynamic waits as discussed above. In embodiments, the delay time can be based on the SLA of a client user 120. For example, client users 120 with a "gold" service classification would receive smaller delay times while regular service classification users would receive longer delays. In embodiments, the Convert onClick function can receive the matrix of health values sent by server 140 and invoke a substitute server for a poorly performing back-end server, e.g., servers 190 and 195. In this manner, a client can invoke another, better performing server to avoid the slow running server.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A computer-implemented method for limiting a request rate from a client based on a health state of a server system, the method comprising:
   monitoring a server system;
   determining a measure of health of the server system, wherein the measure of health comprises a matrix of health values;
   sending the determined measure of health to a client submitting a request to the server system; and,
   receiving a subsequent request from the client that is delayed by a time period, wherein the time period is based at least in part upon the determined measure of health.

2. The method of claim 1, wherein the determining a measure of health of the server system comprises receiving server system CPU utilization.

3. The method of claim 1, further comprising:
   determining an approximate predicted real server response time of a transaction; and,
   sending the determined approximate predicted real server response time of a transaction to a client submitting a request to the server system.

4. The method of claim 1, wherein the determined measure of health sent to the client submitting the request to the server system comprises embedding the matrix of health values in a hyper text markup language (HTML) response.

5. The method of claim 1, further comprising:
   converting links in a HTML response with an onClick function;
   transmitting the HTML response to a client submitting a request to the server system; and,
   creating a delay in the transmission of the request by the client for a calculated time based upon selection of one of the converted links having the onClick function.

6. The method of claim 1, further comprising:
   implementing a request time delay based on a service level agreement (SLA) requirement.

7. The method of claim 1, further comprising:
   generating a processing notification for the request sent by the client.

8. The method of claim 7, wherein the generating a processing notification for the request sent by the client comprises an audio signal and an animating symbol.

9. The method of claim 7, wherein the generating a processing notification for the request sent by the client comprises a dynamic HTML (DHTML) popover frame having a progress animation.

10. A data processing hardware system for limiting a request rate from a client based on a health state of a server system, the data processing system comprising:
    a server comprising hardware and configured for communicative coupling to one or more requesting clients over a computer communications network;
    a request throttler for embedding time delay values in HTML responses to client requests; and
    a system health monitor comprising program code enabled to monitor the health of the server system and to determine a measure of health of the server system, wherein the determined measure of health of the server system comprises a matrix of health values.

11. A computer program product comprising a computer usable storage medium having stored thereon computer usable program code for limiting a request rate from a client based on a health state of a server system, the
    computer usable program code, which when executed by a computer hardware system causes the computer hardware system to perform
    monitoring a server system;
    determining a measure of health of the server system, wherein the measure of health comprises a matrix of health values;
    sending the determined measure of health to a client submitting a request to the server system; and,
    receiving a subsequent request from the client that is delayed by a time period, wherein the time period is based at least in part upon the determined measure of health.

12. The computer program product of claim 11, wherein the computer usable program code further causes the computer hardware system to perform receiving server system CPU utilization.

13. The computer program product of claim 11, wherein the computer usable program code further causes the computer hardware system to perform
    determining an approximate predicted real server response time of a transaction; and,
    sending the determined approximate predicted real server response time of a transaction to a client submitting a request to the server system.

14. The computer program product of claim 11, wherein the computer usable program code further causes the computer hardware system to perform embedding the matrix of health values in a hyper text markup language (HTML) response.

15. The computer program product of claim 11, wherein the computer usable program code further causes the computer hardware system to perform converting links in a HTML response with an onClick function;

transmitting the HTML response to a client submitting a request to the server system; and, creating a delay in the transmission of the request by the client for a calculated time based upon selection of one of the converted links having the onClick function.

16. The computer program product of claim 11, wherein the computer usable program code further causes the computer hardware system to perform implementing a request time delay based on a service level agreement (SLA) requirement.

* * * * *